(12) United States Patent
Koennings et al.

(10) Patent No.: US 11,940,768 B2
(45) Date of Patent: Mar. 26, 2024

(54) MULTI-FUNCTION COOKING APPARATUS WITH REPRODUCIBILITY OF COOKING RESULTS

(71) Applicant: Vorwerk & Co. Interholding GmbH, Wuppertal (DE)

(72) Inventors: Maximilian Koennings, Zurich (CH); Caroline Cozzone, Horgen (CH); Stefan Hilgers, Essen (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 976 days.

(21) Appl. No.: 15/267,976

(22) Filed: Sep. 16, 2016

(65) Prior Publication Data

US 2017/0082996 A1 Mar. 23, 2017

(30) Foreign Application Priority Data

Sep. 18, 2015 (EP) .................................... 15185945

(51) Int. Cl.
*G05B 19/42* (2006.01)
*A47J 36/32* (2006.01)
(Continued)

(52) U.S. Cl.
CPC ........ *G05B 19/0426* (2013.01); *A47J 36/321* (2018.08); *A47J 43/046* (2013.01);
(Continued)

(58) Field of Classification Search
CPC ........ G05B 19/0426; G05B 2219/2642; G05B 2219/2643; A47B 27/62; A47B 36/32; A47B 43/046
See application file for complete search history.

(56) References Cited

U.S. PATENT DOCUMENTS 5,723,846 A * 3/1998 Koether ................. F24C 7/087
219/483
6,953,919 B2 * 10/2005 Clothier ................. H05B 6/062
219/494
(Continued)

FOREIGN PATENT DOCUMENTS

CN 102809932 A 12/2012
CN 203324712 U 12/2013
(Continued)

OTHER PUBLICATIONS

European Search Report issued for EP Application No. 15185945.1, dated Feb. 26, 2016, 8 pages.
(Continued)

*Primary Examiner* — Steven N Leff
(74) *Attorney, Agent, or Firm* — Brake Hughes Bellermann LLP

(57) ABSTRACT

A multi-function cooking apparatus control system and control method for improving the reproducibility of cooking results of a multi-function cooking apparatus includes a recipe program interface component to access a plurality of recipe programs. Predefined operating conditions include an operating parameter setting for a technical capability parameter of the cooking apparatus. An operating parameter interface component receives actual operating parameter values reflecting actual operating conditions of the cooking apparatus. If an actual technical capability parameter deviates from the predefined operating conditions and indicates a non-compensable deficiency of a technical capability of the cooking apparatus, instructions are sent to the cooking apparatus to prevent or stop automatic execution of the particular recipe program. If the actual technical capability parameter deviates from the predefined operating conditions and indicates a compensable deficiency of the technical capability of the cooking apparatus, compensation instruc-
(Continued)

tions are determined for the cooking apparatus according to predefined compensation rules.

14 Claims, 7 Drawing Sheets

(51) Int. Cl.
 *A47J 43/046* (2006.01)
 *G05B 19/042* (2006.01)
(52) U.S. Cl.
 CPC ........... *G05B 2219/2642* (2013.01); *G05B 2219/2643* (2013.01)

(56) References Cited

U.S. PATENT DOCUMENTS

| | | | |
|---|---|---|---|
| 2004/0058706 A1 | 3/2004 | Williamson et al. | |
| 2005/0193901 A1* | 9/2005 | Buehler | A47J 44/00 99/468 |
| 2008/0274240 A1* | 11/2008 | Germouni | G01N 33/02 426/231 |
| 2009/0258331 A1* | 10/2009 | Do | G09B 21/003 434/127 |
| 2013/0074700 A1* | 3/2013 | Cheung | A47J 36/06 99/348 |
| 2013/0171304 A1* | 7/2013 | Huntley | G06Q 50/00 426/231 |
| 2013/0214716 A1* | 8/2013 | Barfus | A47J 43/08 318/434 |

FOREIGN PATENT DOCUMENTS

| | | |
|---|---|---|
| CN | 104133386 A | 11/2014 |
| CN | 104133387 A | 11/2014 |
| DE | 4414825 A1 | 11/1995 |
| DE | 102011085523 A1 | 5/2013 |
| DE | 102013106691 A1 | 1/2014 |
| EP | 2832275 A1 | 2/2015 |
| WO | 2012041660 A1 | 4/2012 |
| WO | 2015051446 A1 | 4/2015 |

OTHER PUBLICATIONS

English translation of First Office Action for Chinese Application No. 201710070896.4, dated Jan. 23, 2019, 20 pages.

* cited by examiner

| step | ingredient | text | code instructions |
|---|---|---|---|
| ... | | | |
| 6 | mixed vegetables | Place 200 g mixed vegetables (celery stalk, carrots and onions), cut into pieces | Scales = ON |
| 7 | extra virgin olive oil | Add 40 g extra virgin olive oil | Scales = ON |
| 8 | | 20 sec/120°C/speed 5 | Time = 20<br>Temp = 120<br>Speed = 5 |
| ... | | | |

502

| step | ingredient | text | code instructions |
|---|---|---|---|
| ... | | | |
| 8 | | 27 sec/120°C/speed 4 | Time = 5<br>Temp = 120<br>Speed = 4 |

| step | ingredient | text | code instructions |
|---|---|---|---|
| ... | | | |
| 6 | salt | Place 10 g salt | Scales = ON |
| 7 | water | Add 1.5 kg water | Scales = ON |
| 8 | | 300 sec/100°C | Time = 300<br>Temp = 100 |
| 9 | Rigatoni | add 400 g Rigatoni | Scales = ON |
| 10 | | 660 sec/100°C | Time = 660<br>Temp = 100 |
| ... | | | |

FIG. 5C

| step | ingredient | text | code instructions |
|---|---|---|---|
| 8 | | 240 sec/97°C | Time = 240<br>Temp = 97 |
| ... | | | |
| 10 | | 690 sec/97°C | Time = 690<br>Temp = 97 |
| ... | | | |

504

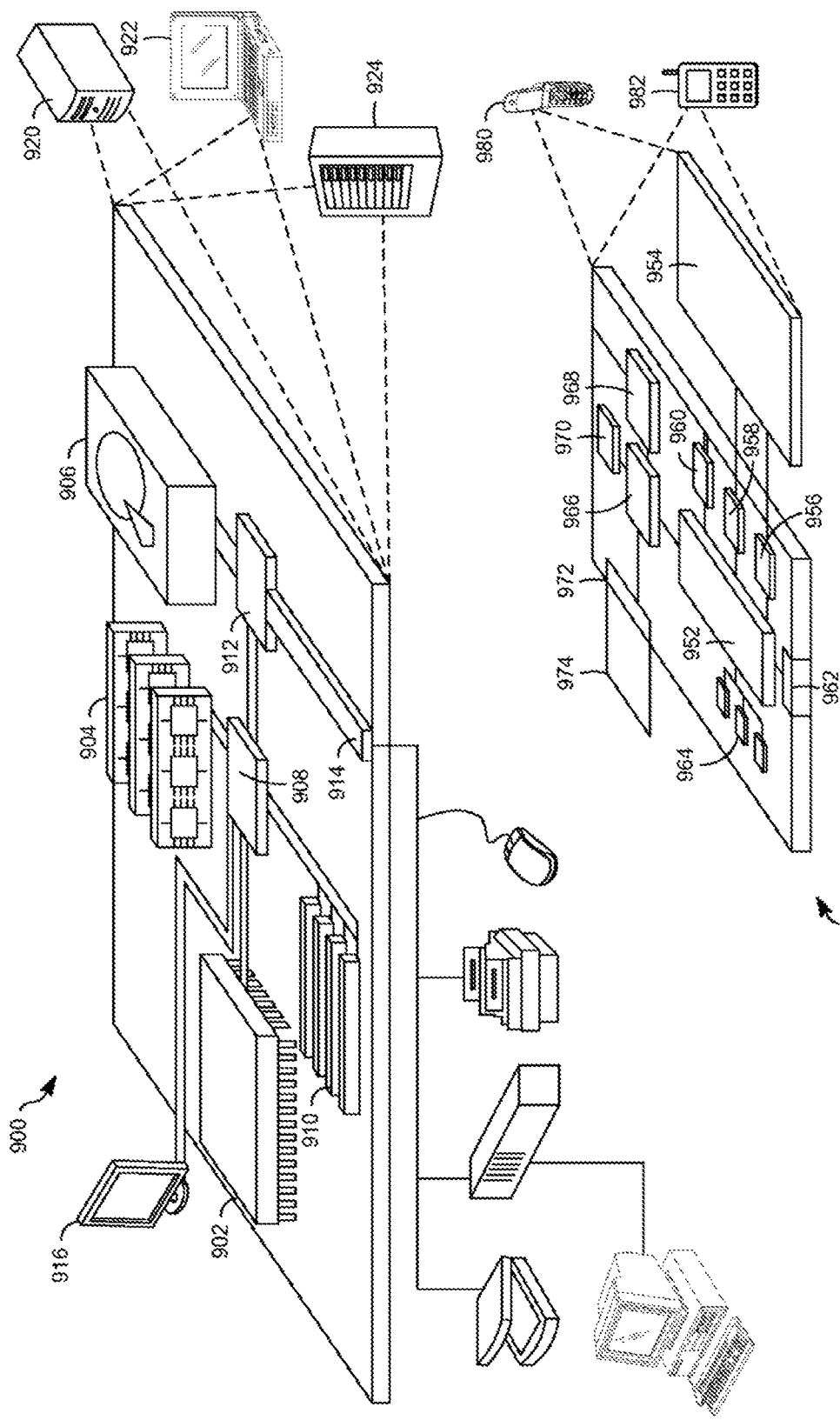

MULTI-FUNCTION COOKING APPARATUS WITH REPRODUCIBILITY OF COOKING RESULTS

CROSS-REFERENCE TO RELATED APPLICATIONS

This application claims priority to European Application No. EP15185945.1, filed on Sep. 18, 2015, entitled "SYSTEM AND METHOD FOR IMPROVING REPRODUCIBILITY OF COOKING RESULTS OF A MULTI-FUNCTION COOKING APPARATUS," which is hereby incorporated by reference.

TECHNICAL FIELD

The present description generally relates to a cooking apparatus.

BACKGROUND

Cooking apparatuses or devices have become more and more intelligent in the recent past by integrating multiple functions into the apparatus. For example, modern cooking devices integrate functions, such as heating, mixing, boiling, pureeing, etc., in a single multi-function cooking device. However, a cooking device typically has to be operated with appropriate technical parameter settings (e.g., temperature settings, rotational speed settings, etc.) to ensure proper operation. Proper operation of a cooking device as used hereinafter includes correct, safe and/or secure operation for producing reproducible cooking results with the cooking apparatus.

A desired cooking result of a particular meal is thereby defined as the cooking result which is provided by the cooking apparatus when being operated in accordance with a predefined recipe program for the meal under predefined environmental conditions (e.g., air pressure, humidity, etc.) and predefined operating conditions of the cooking apparatus (e.g., maximum rotational speed, maximum heating power, heating gradient, etc.). A reproducible cooking result, as used hereinafter, is a cooking result which deviates from a desired cooking result less than a predefined tolerance range. In other words, the desired cooking result can be described by measurable parameters such as for example, consistency, shape, color, temperature, and/or taste of the cooked meal. If such parameters fall within the predefined tolerance range the produced meal is defined as a reproduction of the desired meal, and therefore the processing of the recipe program by the cooking apparatus leads to a reproducible cooking result.

The actual operating conditions of the cooking apparatus while processing a recipe program may deviate from the ideal conditions which are the bases for the recipe program. For example, the cooking apparatus may have a technical deficiency that affects one or more of its technical capabilities (e.g., heating control does not reach maximum temperature; maximum rotational speed cannot be reached anymore; etc.). Further, environmental parameters may deviate from the ideal conditions assumed by the recipe program. For example, if the cooking apparatus is operated in the mountains, the air pressure can be lower than anticipated and the boiling temperature of liquids such as water may be lower than under the conditions assumed for the generation of the recipe program. Further, quantities of the meal ingredients may deviate from the values given in the recipe program.

Any such deviating operating condition or any combination thereof will typically lead to a situation that the cooking result under such deviating operating conditions substantially deviates from the desired cooking result under normal conditions. In other words, the achieved cooking result under the deviating operating conditions may likely fall outside the predefined tolerance range required for reproducible meals.

SUMMARY

A multi-function cooking apparatus supports at least semi-automated cooking. Semi-automated cooking support in the context of this disclosure means that at least some of the cooking steps for preparing a meal with the cooking apparatus can be automatically executed by the cooking apparatus by executing a particular recipe program for the meal. However, there may also be some cooking steps that require user interaction, such as for example, filling the cooking apparatus with particular ingredients. Technical parameter settings of the recipe program can automatically control corresponding cooking functions of the cooking apparatus. For example, a temperature parameter setting can control the temperature of the cooking apparatus. A rotational speed parameter setting can control the rotational speed at which one or more rotatable components of the cooking apparatus rotate. More complex technical parameter settings can allow defining dependencies between technical parameters of different types to control cooking steps. For example, ingredients are stirred until a certain consistency is reached. In this example, the rotational speed is controlled dependent on the consistency of the ingredients. For example, the consistency can be determined based on electrical conductivity. Dependent on the cooking functions supported by the cooking apparatus, the respective technical parameter settings in the recipe program can be interpreted by a process control component of the cooking apparatus and then be applied to the control hardware implementing the cooking function. Examples of basic cooking functions which can be supported by a multi-function cooking apparatus include, but are not limited to, weighing, mixing, crushing, milling, kneading, controlled heating, cooking, beating, stirring, emulsifying, and steaming. Each basic cooking function can be executed by a dedicated hardware component. Some basic cooking functions may use the same hardware component (e.g., a motor used for mixing, crushing and stirring, or a heater for controlled heating and steaming). Basic cooking functions may be performed in parallel when using different hardware components. Examples of technical parameter settings which can be included in a recipe program include but are not limited to cooking time (for one or more cooking steps), rotational speed of a motor of the cooking apparatus (e.g., for stirring or mixing functions), rotational direction of the motor, motor mode, heat control, and pulse mode.

In one embodiment, the multi-function cooking apparatus control system (referred to as control system hereinafter) for improving the reproducibility of cooking results of a multi-function cooking apparatus within a predefined tolerance range includes a recipe program interface component (RPI) configured to access a plurality of recipe programs on a data storage device. The control system can be an integral part of the cooking apparatus itself or it may be implemented on a control device which is communicatively coupled with the cooking apparatus but operated remotely. In a remote control scenario the control system may be implemented on a mobile device, such as for example a smartphone or a tablet computer, or it may be part of a remote cloud based server implementation. Dependent on the implementation scenario the control system may communicate with the cooking apparatus via an internal communication bus (control system is part of the cooking apparatus), via a wireless local area network (WLAN), BLUETOOTH, near field communication (NFC) technology (control system is part of a mobile device operated in the vicinity of the cooking apparatus), or via wide area networks such as the Internet or mobile communication networks (e.g., GSM, UMTS, etc.; control system is part of a remote server solution).

The recipe program storage can be external to the control system or can be an integral part of it. For example, recipe programs may be provided by a remote recipe server solution or they may be stored on a mobile data carrier (e.g., USB stick, CD, DVD, etc.) which can be communicatively coupled with the control system. For example, a recipe program can include instructions with regards to types of ingredients, quantity of ingredients, a sequence for adding or mixing ingredients, control (operating parameter) values (e.g., temperature, speed of the knife, direction of knife rotation, processing time. etc.) for the various processing steps, and the duration for the various processing steps.

A particular recipe program is configured to be executed by the cooking apparatus under predefined operating conditions. The predefined operating conditions include at least an operating parameter setting for a technical capability parameter of the cooking apparatus. In other words, the execution of the particular recipe program by the cooking apparatus leads to a desired cooking result if the operating parameter setting for the technical capability parameter is reproducible to ensure proper operation of the cooking apparatus. That is, as long as the actual value of the technical capability parameter indicates proper functioning of the cooking apparatus, the expected operating conditions regarding the technical capability of the apparatus prevail. The RPI can further forward recipe program instructions of the recipe program to the cooking apparatus to be executed by the cooking apparatus. Any appropriate data interface for the exchange of program instructions may be used.

The control system further has an operating parameter interface (OPI) component to receive actual operating parameter values reflecting actual operating conditions of the cooking apparatus in view of the predefined operating conditions. The operating parameter values can be sensor data captured by internal sensors of the cooking apparatus (e.g., temperature value of the heating system, rotational speed value of the engine, weight value provided by internal scales, pressure value provided by a pressure sensor, etc.). In one embodiment, the operating parameter values can also be received from further sensors external to cooking apparatus. For example, the actual air pressure value of the surroundings of the cooking apparatus or the humidly of the air may be measured by corresponding sensors. In one embodiment, the operating parameters may be provided by an environment data source. For example, in case no air pressure sensor is available but the current location of the cooking apparatus is known, the control system may retrieve this information from an information system which can provide an estimated air pressure value based on current location of the cooking apparatus and the associated altitude above sea level, or based current weather data, etc. The described embodiments can also be combined with each other.

The control system further has an operating conditions evaluator (OCE) component to check the actual operating parameter values. If an actual technical capability parameter deviates from the predefined operating conditions and indicates a non-compensable deficiency of a technical capability of the cooking apparatus, the OCE can send instructions via the OPI to the cooking apparatus to prevent (in case the recipe program is not started yet) or stop (in case the recipe program is already running) automatic execution of the particular recipe program. A non-compensable deficiency is a technical deficiency regarding a technical capability of the cooking apparatus which will prevent a reproducible cooking result in any case. For example, the heating function of the cooking apparatus may be defective and the maximum temperature which can be reached may be only 60 degrees. In this case for any recipe program which requires the boiling of water at 100 degrees such deficiency would be non-compensable because corresponding recipe program instructions could not be properly executed by the cooking apparatus.

For example, the instructions to prevent or stop automatic execution of the recipe program may be configured to prevent or terminate any execution of the recipe program (including manual execution by a user) if the non-compensable deficiency relates to a safety relevant function of the cooking apparatus. In this implementation, the probability for safe operation of the cooking apparatus is increased.

If the OCE determines that the actual technical capability parameter deviates from the predefined operating conditions and indicates a compensable deficiency of the technical capability of the cooking apparatus, the OCE can determine compensation instructions for the cooking apparatus according to predefined compensation rules. For example, the actual maximum temperature value which is measured by the temperature sensor of the cooking apparatus may be 90 degrees. This would lead to similar consequences regarding the reproducible cooking result as the deficiency in the previous example. However, if in this case the origin of the too low maximum temperature value is a de-calibration of the temperature sensor (rather than a defect of the heating system) the deficiency may be compensable by sending recalibration instructions (compensation instructions) to the temperature sensor for restoring the technical capability of correct temperature measurements.

In some cases, the deficiency may be compensable by adjusting the recipe program. For example, if the origin of the deficiency is a defect of the motor of the cooking apparatus which results in a maximum rotation speed which is lower than required by a rotation speed parameter setting of the recipe program, then a desired milling granularity of particular ingredients may not be achieved with the milling time set in the respective program instruction. However, if the maximum rotation speed which can still be reached is close to the desired rotation speed, the deficiency may be compensated by increasing the milling time interval accordingly. For example, appropriate compensation instructions can be retrieved from a database with recipe program adjustment patterns, where multiple combinations of operation parameter settings are stored leading to comparable cooking results. For this purpose, the control system has a recipe program adjustment (RPA) component configured to adjust the particular recipe program according to the determined compensation instructions in case the compensation instructions include at least one recipe adjustment instruction. That is, the RPA can identify a program instruction in the particular recipe program which would lead to an undesired cooking result when being executed by the cooking apparatus because of the technical deficiency. However, if the deficiency can be compensated by a recipe adjustment the identified program instruction is replaced by the RPA with an appropriately adjusted recipe instruction which is then provided to the cooking apparatus via the RPI. The adjusted recipe instructions are then provided to the recipe program memory component of the cooking apparatus to replace the corresponding original recipe instructions.

As a result, the control program ensures that in cases of non-compensable deficiencies which do not allow for a reproducible cooking result the automatic execution of the program is prevented or stopped and in cases of compensable deficiencies either the corresponding technical capability of the cooking apparatus is restored or an appropriate recipe program instruction adjustment is performed. In the latter cases, the cooking apparatus can provide a reproducible cooking result despite the technical deficiency.

In one embodiment, the OCE checks the type of the actual technical capability parameter. If the actual technical capability parameter can be calibrated (e.g., a temperature or weight sensor calibration), the OCE can retrieve technical capability parameter settings from a capability parameter database and send compensation instructions which include calibration instructions for a respective technical component of the cooking apparatus according to the retrieved technical capability parameter settings. The cooking apparatus can then use the compensation instructions to restore the deficient capability of the respective technical component. If the actual capability parameter cannot be calibrated, the OCE can determine, in accordance with a recipe program adjustment pattern database, adjusted recipe program instructions which are configured to improve the reproducibility of the cooking result with the deficient capability of the respective technical component. The recipe program adjustment component can generate (e.g., replace or insert) adjusted recipe program instructions corresponding to the compensation instructions to compensate for the deficiency of the technical capability and to adjust the recipe program accordingly.

In one embodiment, the control system may receive further actual operating parameter values which correspond to further predefined operating conditions. Such further predefined operating conditions may include operating parameter settings of various parameter types. For example, the operating parameter settings may relate to machine status parameters of the cooking apparatus and/or to environment parameters of the cooking apparatus. The RPA can adjust the recipe program according to predefined adjustment rules if an actual machine status parameter or an actual environment parameter is outside a tolerance range of the predefined operating conditions.

For example, if the internal temperature sensor (actual machine status parameter) shows, because of an earlier heating step, a temperature of 30 degrees for the cooking pot of the cooking apparatus and the next step requires a temperature below 15 degrees (e.g., in the case of preparing cream), the RPA can insert a recipe program instructions which includes a wait statement with a waiting time which is long enough to let the cooking apparatus cool down to the required temperature. Alternatively, in addition the RPA may insert a recipe program instruction in the recipe program to instruct a user to place the cooking pot of the cooking apparatus in a refrigerator during the waiting time. In this case, the inserted waiting time instruction can include a shorter waiting time because the cooling is accelerated.

For example, if an air pressure sensor (actual environment parameter) indicates an actual air pressure value which is below the desired operating conditions (e.g., because the cooking apparatus is operated at significant altitude above sea level), the temperature control value in recipe instruction with the intention to boil water may be adjusted accordingly. Because at lower air pressure the water already boils at lower temperatures the RPA may replace the heating time of the original recipe instruction by a shorter heating time.

Further embodiments relate to a multi-function cooking apparatus including a control system as previously disclosed, a control method for a multi-function cooking apparatus to improve reproducibility of cooking results, and a computer program product having computer program instructions which when being loaded into a memory of the control system and being executed by at least one processor of the control system cause the at least one processor to execute the steps of said control method.

The method may include the following operations: accessing a recipe program, the recipe program including program instructions being configured to be executed by the cooking apparatus under predefined operating conditions, wherein the predefined operating conditions include at least an operating parameter setting for a technical capability parameter of the cooking apparatus; receiving actual operating parameter values reflecting actual operating conditions of the cooking apparatus in view of the predefined operating conditions; if an actual technical capability parameter deviates from the predefined operating conditions and indicates a non-compensable deficiency of a technical capability of the cooking apparatus, sending instructions to the cooking apparatus to prevent or stop automatic execution of the recipe program; if the actual technical capability parameter deviates from the predefined operating conditions and indicates a compensable deficiency of the technical capability of the cooking apparatus, providing compensation instructions to the cooking apparatus according to predefined compensation rules; if the actual technical capability parameter is within a given tolerance range and/or if the compensation instructions include adjusted recipe program instructions, forwarding the respective recipe program instructions to the multi-function cooking apparatus for execution.

In one embodiment, the method further includes: checking the type of the actual capability parameter; if the actual capability parameter can be calibrated, retrieving technical capability parameter settings from a capability parameter database, and sending compensation instructions which include calibration instructions for the cooking apparatus according to the retrieved technical capability parameter settings to restore the deficient capability of a respective technical component of the cooking apparatus; if the actual capability parameter cannot be calibrated, determining, in accordance with a recipe program adjustment pattern database, adjusted recipe program instructions which are configured to provide the approximately reproducible cooking result with the deficient capability of the respective technical component, and generating corresponding compensation instructions comprising the adjusted recipe program instructions to compensate for the deficiency of the technical capability and adjusting the recipe program accordingly.

In a further embodiment, the computer program instructions may be stored on a computer readable medium forming said computer program product.

Further aspects may be realized and attained by means of the elements and combinations particularly depicted in the appended claims. It is to be understood that both the foregoing general description and the following detailed description are exemplary and explanatory only, and are not restrictive.

BRIEF DESCRIPTION OF THE DRAWINGS

FIG. 4 shows an exemplary characteristic curve of a temperature sensor which may be used in one embodiment.

FIGS. 5A to 5D show simplified examples of recipe program instructions.

FIG. 6 shows a characteristic curve for the boiling point of water in dependence of the air pressure.

FIG. 7 is a diagram that shows an example of a generic computer device and a generic mobile computer device, which may be used.

DETAILED DESCRIPTION

Figure 1:
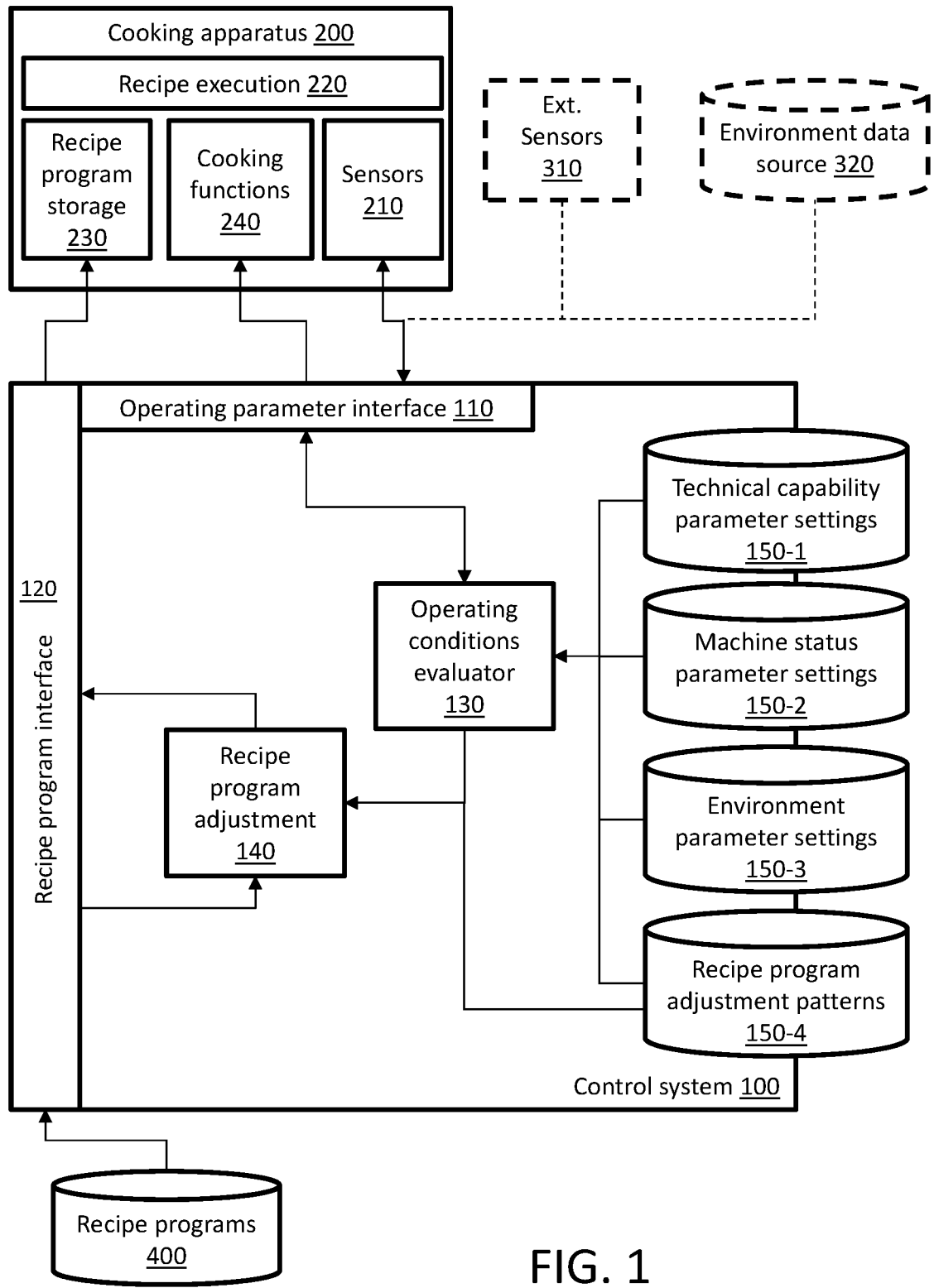
FIG. 1 is a simplified component diagram of a control system for improving the reproducibility of cooking results of a multi-function cooking apparatus according to one embodiment.
Figure 2:
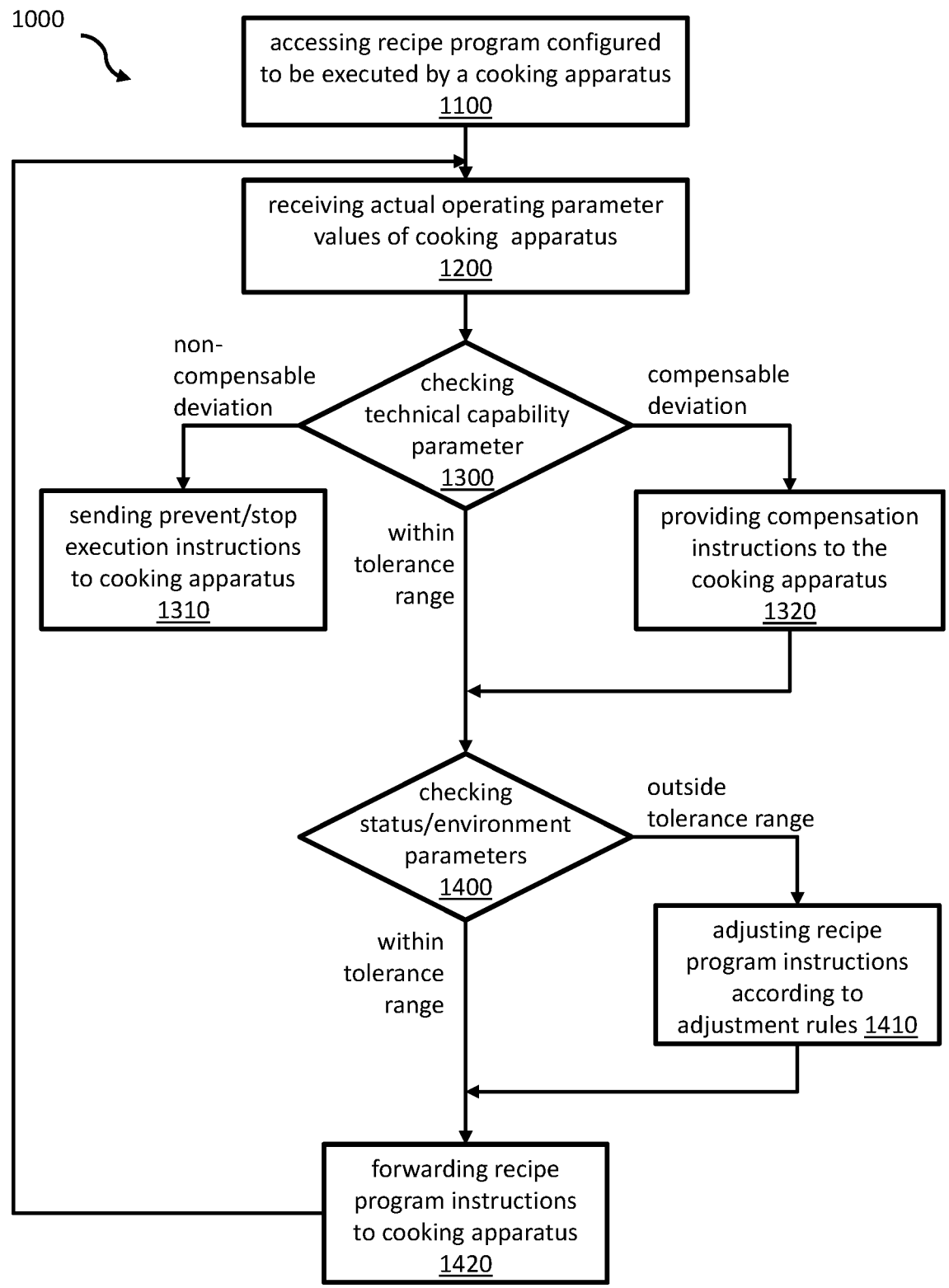
FIG. 2 is a simplified flow chart of a computer-implemented control method for a multi-function cooking apparatus to improve reproducibility of cooking results according to one embodiment.

FIG. 1 is a simplified component diagram of a control system 100 for improving the reproducibility of cooking results of a multi-function cooking apparatus 200 according to one embodiment. FIG. 1 will be described in the context of the simplified flowchart of FIG. 2 for the method 1000 being executed by the control system 200. The following description makes use of reference numbers referring to both, FIG. 1 and FIG. 2.

The controlling system 100 is communicatively coupled with the cooking apparatus 200 via interface components 110, 120. The interfaces can have any appropriate interface type supporting the exchange of data between the cooking apparatus 200 and the control system 100. For example, a serial interface (e.g., a USB interface) or a parallel interface (e.g., an IEEE 1284 interface), or an internal communication bus may be used. The control system 100 can be an integrated component of the cooking apparatus 200 or it can be implemented remotely (e.g., on a mobile device like a smartphone or tablet PC, or on a remote server which may communicate with the cooking apparatus over the Internet or mobile communication standards).

The control system is further communicatively coupled with a data storage device 400 storing recipe programs for the cooking apparatus 200 via the recipe program interface 120. The data storage device 400 can be any device with a memory for storing structured data. The data storage device may have a database or a file system to store recipe programs which are intended to be executed by the cooking apparatus. A recipe program example is disclosed in the context of FIGS. 5A, 5B. A recipe program is a digital recipe which includes a plurality of control instructions (referred to a recipe program instructions or program instructions hereinafter) with at least one technical parameter setting to control cooking steps of functions performed by the cooking apparatus 100 when the recipe program is executed by a recipe execution component 220 of the cooking apparatus 220.

The cooking apparatus 200 has a memory component 230 to store recipe program instructions which are to be processed by the recipe execution component 220. For example, the recipe execution component 220 can include an interpreter for interpreting the control instructions. The basic cooking functions are then performed by respective hardware components 240 (e.g., motor, heating means, scales, etc.) of the cooking apparatus under the control of the execution component 220. Basic cooking functions using different hardware may be performed in parallel (e.g., heating and stirring). That is, the execution component 220 transforms the program instructions into control signals applied to the hardware components 240. A person skilled in the art can build a corresponding interpreter for this purpose. Persons of skill in the art can implement the mapping of program instructions to hardware control signals, for example, by using instructions in so-called machine-code that control the hardware components directly. In case the cooking apparatus receives adjusted recipe program instructions from the control system 100, the adjusted recipe program instructions replace the corresponding original program instructions stored in the memory component 230.

The recipe program interface 120 of the control system can access 1100 and retrieve recipe programs from the data storage 400 and forward 1420 the retrieved recipe programs directly to the cooking apparatus for execution if no recipe adjustments are necessary. However, the control system 200 is configured to adjust recipes instructions under certain conditions before they are forwarded to the cooking apparatus. Adjusted recipe instructions may also be sent 1420 to the cooking apparatus 200 to overwrite already loaded recipe instructions with the adjusted recipe instructions in cases where the actual operating conditions deviate from predefined operating conditions while the cooking apparatus is already executing a recipe program. As explained earlier, the recipe programs retrieved from the recipe program storage 400 are designed to provide optimal and reproducible cooking results for respective meals when the cooking apparatus is operated under predefined operating conditions while executing the respective recipe programs. For monitoring the actual operating conditions of the cooking apparatus, the apparatus 200 has a plurality of sensors 210 for measuring actual technical parameter values which reflect the current technical status (actual operating conditions) of the machine. Examples of the sensors 210 are given in the following.

The sensor data of the sensors 210 can be received by the control system 100 through the operating parameter interface 110. The received sensor data can also indicate a technical deficiency of the cooking apparatus. Processing the sensor data can lead to an indication of a defect in the sense that the apparatus 200 can perform a particular function not at all or only with restrictions. For example, the heating function, weighing function, or the motor function of the apparatus 200 may be deficient in the sense that they are still functioning to some extent but that they have lost their technical capabilities to perform a particular cooking function according to the parameter settings of a particular recipe instruction. This may prevent successful execution of the recipe instruction.

The control system 100 has OCE 130 which is configured to check 1300 the technical capability parameters of the cooking apparatus by comparing the received actual sensor 210 data with parameters stored in a technical capability parameter settings (TCPS) database 150-1. The TCPS includes reference values for the technical parameters monitored by the sensors 210 of the cooking apparatus, wherein the reference values include for each technical parameter an interval of parameter values within a tolerance range which correspond to the predefined operating conditions. In other words, the TCPS data describes the technical parameter values of the cooking apparatus under normal operating conditions without any technical deficiencies. The TCPS database can be an integral part of the control system 100 or it may be provided remotely (e.g., by a remote server) to the control system.

To perform such checks the OCE 130 compares the received sensor data with reference parameter value intervals of one or more predefined operating parameter settings stored in the corresponding databases (e.g., the TCPS database 150-1). If the OCE 130 determines that the received sensor data are within predefined tolerance ranges of the respective predefined parameter intervals (i.e., no technical deficiency detected) the control system can forward 1420 any corresponding recipe instructions to the cooking apparatus or, optionally, it may perform further checks 1400 for further parameters.

If a received actual parameter relates to an actual technical capability parameter of the cooking apparatus (e.g., the parameter is included in the TCPS 150-1), and the received parameter value deviates from the predefined operating conditions and indicates a non-compensable deficiency of a technical capability of the cooking apparatus 200, then the control system sends 1310 instructions to the cooking apparatus 200 to prevent or stop automatic execution of the to-be-executed recipe program. The OCE 130 can use predefined rules to decide whether a deficiency is compensable or non-compensable. Such predefined rules may be stored as rule database within the OCE 130 or they may be available in the corresponding operating parameter settings databases 150-1 to 150-4. For example, if the respective received actual operating parameter is outside the predefined tolerance range for this operating parameter (including values which are not part of a predefined list of discrete values), and the deficiency is not related to the calibration of a sensor, and the deficiency is non-compensable by recipe adjustment (as for example defined in a recipe program adjustment patterns (RPAP) database 150-4), then a non-compensable deficiency is detected. For the classification of the deficiency the OCE can use any predefined parameter value setting stored in any one of the operating parameter settings databases with a corresponding predefined ruleset.

For example, if the recipe execution component 220 has not yet started the execution of a particular recipe program, the automatic start of program is prevented by the received instructions if the OCE 130 has detected a non-compensable deficiency of the cooking apparatus. If the execution of the recipe program has already started the received instructions will stop the further automatic execution of the recipe program.

In some cases, a user may still override the prevent/stop instruction and manually restart the program to proceed with the recipe processing. However, the cooking result in this case is not a reproducible cooking result. In one implementation, the TCPS or the cooking apparatus further can store information about which operating parameters are relevant for safe operation of the cooking apparatus 200. In this implementation, even a manual start/restart of the recipe program after the receipt of the prevent/stop instructions can be prevented in cases where the non-compensable deficiency is associated with a safety relevant operating parameter. For example, if the actual rotational speed of the motor exceeds the predefined maximum speed, such a safety stop instruction may be sent to the recipe execution 220 to immediately stop any further execution of the recipe program for avoiding damage to the cooking apparatus or to the user.

For example, the TCPS 150-1 may store predefined valid temperature settings 0, 37, 40, 45, 50, 55, 60, 65, 70, 72, 75, 80, 85, 90, 95, 98, 100, 105, 110, 115, 120, 121 (e.g., degrees Celsius), valid time settings between 00:00 and 99:59 (e.g., hours:seconds), valid rotational speed settings between 0.0 and 10.0 (e.g., revolutions per second) in steps of 0.5 and additionally soft (e.g., 0.1, 0.2 and 0.3). Predefined valid motor mode settings may be normal, turbo preset, turbo running, dough preset, dough running and automated recipe. Predefined valid rotational direction settings can be left or right, and, for example, predefined valid turbo pulse time interval settings may be 500 ms, 1000 ms, or 2000 ms. A predefined valid turbo pulse count can be between 1 and 10. The various turbo modes can be characterized through rotational speeds which exceed the normally allowed maximum rotational speed for relatively short time intervals (turbo pulse). For example, the allowed maximum rotational speed may be in the range of 7000 to 9000 revolutions per minute whereas the various turbo pulse modes may be associated with rotational speeds above 10000 revolutions per minute during the allowed turbo pulse time intervals. There can be additional TCPS settings or rules defining, for example, constraints for certain combinations of technical parameters. For example, when the temperature exceeds 80° C. the motor must not be switched to a turbo mode increasing the rotational speed. Such rules combining multiple technical parameter settings of different types are also referred to as complex parameter rules. In one embodiment, the rules can be implemented in a hierarchical structure. For example, first level rules may be used to define independent ranges for respective technical parameters. Such a range defines a tolerance range for an individual operating parameter which is allowed for the cooking apparatus by not taking into account potential conflicts with parameter settings of other parameter types. First level rules can be applied to an individual technical parameter setting, for example, in a single control instruction. Second level rules (e.g., complex rules) can define allowed dependencies between parameter settings of different types and the consequences for the respective control step. Higher levels of complexity (e.g., multi-dependencies between multiple parameter types) can be implemented in further levels of the hierarchical rule structure. Second level or higher level rules can be applied to multiple technical parameter settings which may be spread over multiple control instructions.

If a received actual parameter relates to an actual technical capability parameter of the cooking apparatus and if the actual technical capability parameter deviates from the predefined operating conditions and indicates a compensable deficiency of the technical capability of the cooking apparatus, the control system 100 can provide 1320 compensation instructions to the cooking apparatus 200 according to predefined compensation rules.

Figure 3:
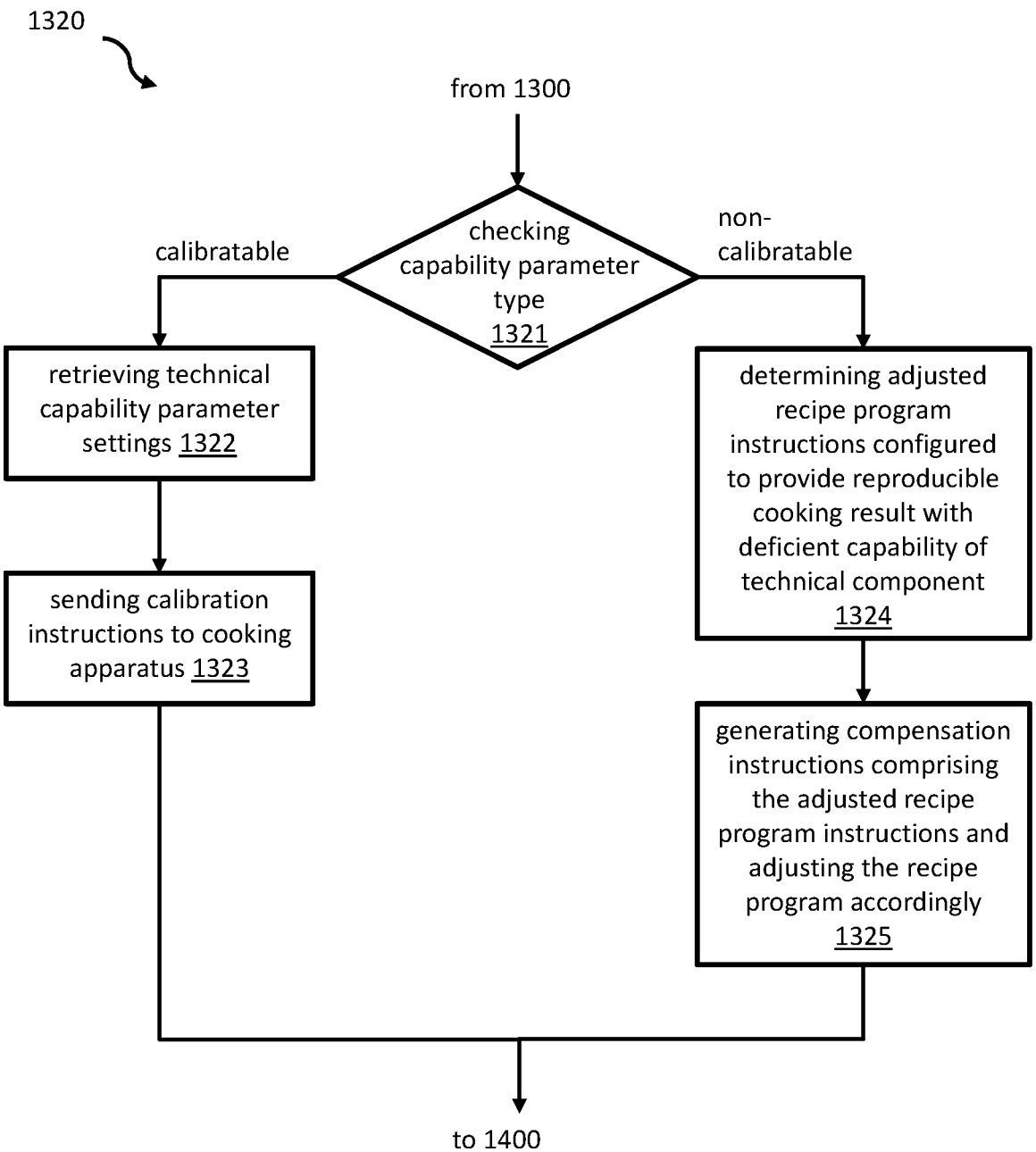
FIG. 3 is a simplified flow chart illustrating sub-steps of the control method for providing compensation instructions according to one embodiment.

Turning briefly to FIG. 3, sub-steps of the providing step 1320 are shown. The OCE 130 first checks 1321 the type of the actual capability parameter. For example, the type can be stored in the TCPS 150-1 together with the respective parameter. If the actual capability parameter can be calibrated (calibratable), the OCE 130 can retrieve 1322 technical capability parameter settings from a capability parameter database (e.g., TCPS 150-1) and send 1323 compensation instructions which include calibration instructions for the cooking apparatus according to the retrieved technical capability parameter settings. The cooking apparatus 200 can the use the calibration instructions to restore the deficient capability of a respective technical component. For example, if the received temperature values are beyond the maximum temperature which can be reached with the heating of the cooking apparatus under normal operating conditions and there is no indication for a deficiency of the heating component then the temperature sensor may simply be recalibrated according to the calibration instructions.

However, if the actual capability parameter cannot be calibrated (non-calibratable), the OCE 130 can still determine 1324, in accordance with the recipe program adjustment pattern database 150-4, adjusted recipe program instructions which are configured to provide the reproducible cooking result with the deficient capability of the respective technical component. For this purpose, a recipe program adjustment component 140 generates 1325 corresponding compensation instructions comprising the adjusted recipe program instructions to compensate for the deficiency of the technical capability and adjusting the recipe program accordingly. A detailed example is provided in FIG. 4.

Turning back to FIGS. 1 and 2, further optional embodiments of the control system 100 are disclosed. The OCE 230 can implement a further check 1400 where additional operating parameters not related to the technical capabilities of the cooking apparatus can be compared with predefined parameter settings.

For example, the sensors 210 provide a general snapshot of the machine status also under normal operating conditions when all cooking functions 240 work properly. Nevertheless, an actual machine status parameter value can still be outside the tolerance range of the predefined operating conditions. For example, the cooking apparatus is about to execute a recipe program for making cream. In case the apparatus was used before to prepare a soup, the cooking apparatus may still be at a temperature which is significantly above the 17 degrees which is the ideal temperature setting of the recipe for making cream. In case the cooking apparatus would start with the execution of the cream recipe at the high temperature, the cooking result would not be the desired cooking result. In this case the control system can include or access a machine status parameter setting (MSPS) database 150-2. The MSPS can store critical machine status parameter settings for particular recipes. In the example, the MSPS may store the information that for the program ID of the cream making recipe program the temperature needs to be 17 degrees with a tolerance range of +/−1.5 degrees. As a consequence, the OCE 130 detects that the respective machine status parameter (e.g., temperature) value is outside the required tolerance range which would lead to a non-reproducible cooking result for the cream if executed. The RPA 140 is now instructed by the OCE 130 to adjust 1410 the recipe program in accordance with predefined adjustment rules. The RPA can query the RPAP 150-4 for a corresponding recipe adjustment pattern. The RPAP 150-4 may store one or more temperature profiles over time which representing the cooling down behavior of the cooking bowl at different temperatures of the environment. For example, one temperature profile may relate to the cooling behavior at room temperature and a further temperature profile may relate to the cooling behavior when the bowl is placed in a refrigerator at 7 degrees. Based on such profiles the RPA 140 can pursue various recipe adjustment strategies. For example, the RPA may insert a wait instruction at the beginning of the cream recipe program. The wait time can be computed from the respective temperature profile. In the case of the cream recipe the first temperature profile cannot be used because the final temperature will not be below room temperature and therefore not low enough for a reproducible cooking result. Therefore, the RPA 140 selects the second temperature profile to compute the time it will take to cool down the bowl from the current temperature to the required temperature and uses this time as time parameter t_wait for the inserted wait instruction. Further, the RPA 140 can insert a further recipe instruction which includes an instruction for the output means (display, audio) of the cooking apparatus to instruct the user that the bowl needs to be placed in the refrigerator for the period t_wait. This check may be repeatedly performed by the control program. That is, if the user brings back the bowl too early, again the corresponding machine status parameter values will be detected outside the required tolerance range and the recipe a program adjustment 1410 is performed again. As a result, the cooking apparatus does not start to execute the cream recipe program before the operating conditions for a reproducible cooking result are fulfilled.

Other examples for operating parameters of the cooking apparatus are environment parameters which may have impact on the cooking result. Examples of environment parameters are the air pressure or the air humidity of the environment. As already described earlier, the air pressure has an impact on the boiling temperature of water. The air humidity has an impact on the consistency of foamy food (e.g., beaten egg, milk foam, etc.) and may further impact the results of milling steps (e.g., the milling of coffee beans). Such environment parameter values may be captured either by sensors 210 of the cooking apparatus or by external sensors 310 which are communicatively coupled with the control system 100 (either directly of via the cooking apparatus). Further, an external environment data source (EDS) 320 may be used to retrieve such data. For example, the cooking apparatus may know its physical location (e.g., through a location sensor using GPS, WLAN based location determination, etc.). This information is available for the control system through the operating parameter interface 110. The EDS 320 may provide a service which transforms the location data of the cooking apparatus into an altitude above sea level by using geographic databases. It may further determine the average air pressure value which corresponds to the determined altitude and provide this derived air pressure value as an actual environment parameter value to the OCE 130. In an alternative embodiment, sensors 210 may include a barometer to measure the actual air pressure. The OCE 130 can check 1400 the received air pressure value by comparing it with a reference value (predefined operating conditions) in an environment parameter settings (EPS) database 150-3. If the received actual air pressure value is outside the tolerance range of the predefined operating conditions the OCE 130 instructs the RPA 140 to adjust 1410 the recipe program according to predefined adjustment rules of RPAP 150-4. For example, the RPAP 150-4 may store an "air-pressure vs. water boiling temperature profile". Based on this profile the RPA 140 can derive an adjusted temperature control parameter for the heating of the cooking apparatus. In cases where the actual air pressure is lower than the reference value (e.g., the value at sea level) in the environment parameter settings 150-3, a lower temperature control parameter value can be inserted into the corresponding recipe program instruction and forwarded 1420 to the cooking apparatus. When executing the adjusted recipe program instruction with the recipe execution component 220 energy may be saved when compared to the original program instructions because the lower temperature can be reached faster and, as a consequence, heating time is reduced.

In one example scenario, the control system can perform a check of technical capabilities of the cooking apparatus. For example, the parameter value of a temperature sensor of the apparatus may deviate from a reference value provided by a further temperature sensor (e.g., an external sensor or a second internal temperature sensor). Modules with a high degree of integration increasingly use simple PTC (Positive Temperature Coefficient) or NTC (Negative Temperature Coefficient) temperature sensors in SMD designs or as chip sensors. For example, a temperature offset of 5 degrees may be detected compared to the reference value. The execution of a recipe program using temperature setting commands would therefore likely not deliver a reproducible cooking result. A temperature sensor may measure the resistance of a resistor and transfer the resistance into a numerical ° C. value. For example, the sensor may have a resistance of 1000Ω (at 25° C.) and a typical temperature coefficient of 0.76%/K with:

$$R(T)=1000\Omega \cdot (1+A\cdot (T-25°\text{ C.})+b\cdot (T-25°\text{ C.})^2)$$

Where $A=7.635 \cdot 10^{-3}$° C.$^{-1}$ and $B=1,731 \cdot 10^{-5}$° C.$^{-2}$

Figures 4, 5A:
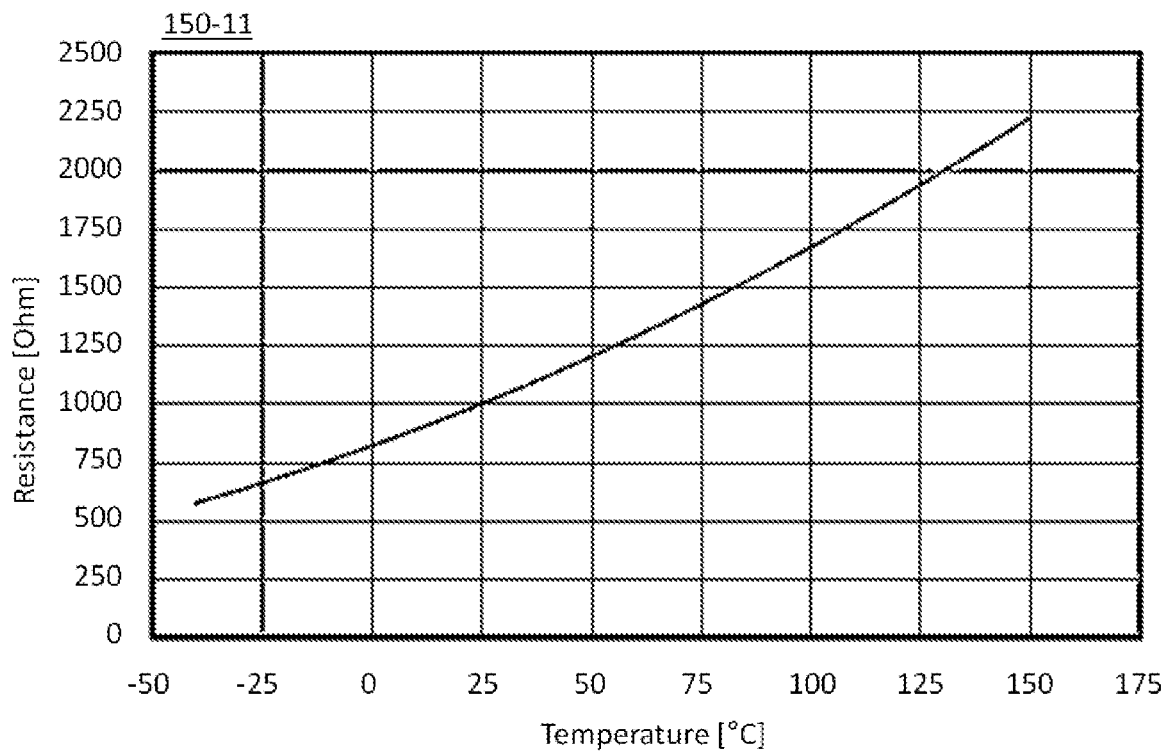

The measurement tolerance of the sensor in the range 1 mA . . . 3 mA may be max.±3% at 25° C., max.±2% at 100° C. FIG. 4 shows an exemplary characteristic curve 150-11 of a PTC temperature sensor which may be stored in the TCPS.

The OCE can retrieve the characteristic curve and apply the detected offset to the curve. The result can be sent to the cooking apparatus as calibration instruction to recalibrate the internal temperature sensor.

During the capability check, the OCE may further detect a limitation of the maximum rotation speed of the motor. For example, the cooking apparatus may have a memory where the maximum rotation speed is stored during recipe execution when a recipe program includes a maximum speed instruction. The TCPS can include a characteristic curve for the rotational speed associated with respective speed settings (e.g., 1 to 5). In the example, the last measured rotational speed of the cooking apparatus is 20% below the target value for speed setting 5 which corresponds to speed setting 4. That is, the OCE detects a technical deficiency of the motor regarding the current maximum rotational speed of the cooking apparatus. This deficiency cannot be cured by a recalibration instruction as it was possible in the case of the temperature sensor. However, in view of the recipe program to be executed by the recipe execution component, a reproducible cooking result can still be achieved by adjusting the recipe program 501.

FIG. 5A shows a simplified example of a part of a recipe program 501. The recipe program 501 includes control instructions instructing a user (e.g., via a display) to place 200 g mixed vegetables (celery stalk, carrots and onions), cut into pieces (step 6). The scales are automatically turned on through the respective code instruction. Similarly, in the next step 7, the user is instructed to add 40 g extra virgin olive oil. In step 8 the cooking apparatus receives recipe instructions to automatically set technical parameters for processing the added ingredients. The time parameter setting is set to 20 seconds, the temperature setting is set to heat the content to 120° C. while the motor rotation speed setting is set to maximum speed 5.

The OCE knows from the capability parameter check that speed 5 cannot be achieved anymore by the deficient motor but speed 4 is still possible. The RPAP database may include an alternative pattern regarding the original parameter setting in the recipe program 501. For example, instead of using the settings Time=20, Temp=120, Speed=5 the cooking apparatus may go at the lower Speed=4 for a longer time Time=27. By using this information the OCE can instruct the RPA to generate corresponding adjusted recipe program instructions which are appropriate for compensating the technical deficiency of the motor. FIG. 5B shows the adjusted recipe program instruction for program step 8 which now includes the new parameter settings Time=27, Temp=120, Speed=4 as retrieved from the RPAP. The RPAP may include alternative control parameter settings for particular recipe steps when applied to particular ingredients. That is, the adjusted control parameters for step 8 might be different when applied to other ingredients.

Figures 5D, 6:
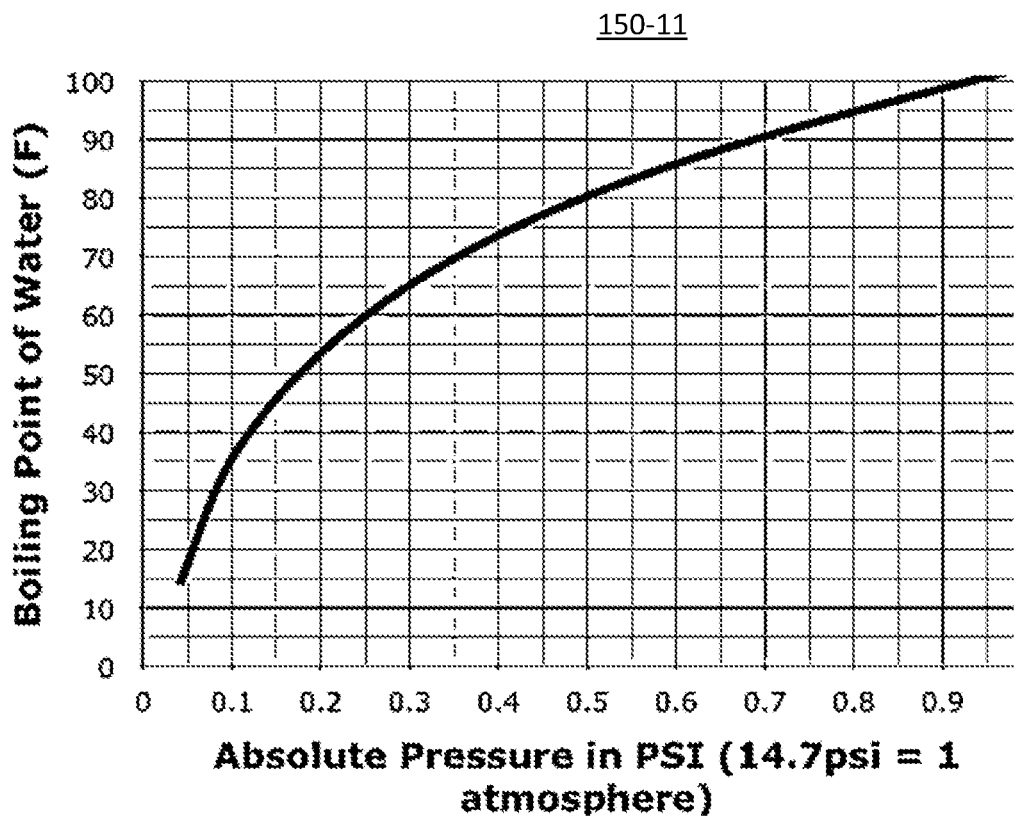

A further example of recipe adjustment is shown in FIGS. 5C, 5D. In this example scenario Rigatoni is prepared by the cooking apparatus. To achieve a reproducible cooking result with regards to the "al dente" property of noodles it is important that the boiling time of the noodles is strictly defined. Under normal operating conditions, water is boiling at 100 degrees centigrade. The recipe program 503 in FIG. 5C includes steps 5 to 10 where salt (step 6) and water (step 7) are added and then heated for 5 minutes to reach 100 degrees (step 8). At this time the water is boiling. Then the noodles are added and cooked for 11 minutes at 100 degrees to produce the "al dente" cooking result.

When executing this recipe program under operating conditions with a lower air pressure (e.g., at an altitude of 2000 m above sea level), the OCE may receive the actual air pressure value which may be significantly below the predefined operating conditions. The OCE may retrieve from the EPS a characteristic curve 150-31 for the boiling point of water in dependence of the air pressure as shown in FIG. 6. From this curve the OCE can determine the boiling temperature of water under the actual operating conditions. A further characteristic curve which may be stored in the MSPS can provide the information about the time it takes to reach the boiling point under actual operating conditions. In the example, a boiling point of 97 degrees and a boiling time interval of 240 sec are determined. The RPAP may further include alternative adjustment patterns for the "al dente" result of Rigatoni at different boiling temperatures. In the example, the alternative setting is 690 seconds at 97 degrees. The OCE can then instruct the RPA to adjust the recipe instructions accordingly. The adjusted recipe instructions are shown in the recipe program 504 of FIG. 5D.

A further example is briefly described with regards to the recipe program 501 in FIG. 5A. The user may add 300 g of mixed vegetables instead of the suggested 200 g. The cooking apparatus may prompt the user with a warning that the measured weight from the scales sensor deviates from the predefined operating conditions, and may interrupt the automatic recipe execution until the user either corrects the amount or confirms that the deviating ingredient amount was added intentionally. In the latter case, the execution of the remaining recipe instructions according to the predefined operating conditions will not lead to a reproducible cooking result. The OCE may use the MSPS to retrieve a correction factor for further program instructions involving the scales sensor. For example, the 40 g instruction in step 7 may be adjusted to 60 g by using the correction factor. In addition, the RPAP may include particular adjustment patterns for oil in case of weight deviations. For example, a rule for oil as an ingredient may be defined which increases the oil amount only be 50% of the correction factor. That is, in the example, the correction factor derived from the original weight deviation (300 g instead of 200 g) is 50%. This would adjust the recipe program instruction in line 7 to "Add 60 g extra virgin olive oil". In case of the additional particular adjustment pattern, the increase for oil would be only 50% of 50% (i.e., 25%) resulting in an adjusted recipe program instruction "Add 50 g extra virgin olive oil". The scales sensor will then compare the added amount with the adjusted recipe program instructions. That is, the recipe adjustment during the execution of a recipe program in this case affects the predefined operating conditions for the remainder of the program instructions. in addition to the weight adjustments further adjustments may be necessary. For example, step 8 may now be adjusted to Time=30, Temp=120, Speed=5, if a corresponding adjustment pattern is available in the RPAP of MSPS settings.

FIG. 7 is a diagram that shows an example of a generic computer device 900 and a generic mobile computer device 950, which may be used with the techniques described here. Computing device 900 relate to the control system 100 (cf. FIG. 1). Computing device 950 is intended to represent various forms of mobile devices, such as personal digital assistants, cellular telephones, smart phones, and other similar computing devices. In the context of this disclosure the computing device 950 may serve as a frontend control device of the control system 900. The components shown here, their connections and relationships, and their functions, are meant to be exemplary only, and are not meant to limit implementations described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The invention claimed is:

1. A control system for improving the reproducibility of cooking results of a multi-function cooking apparatus within a predefined tolerance range, the multi-function cooking apparatus including at least two hardware components, each providing at least one cooking function, comprising:
   a recipe program interface component configured to access a plurality of recipe programs on a data storage device, wherein a recipe program of the plurality of recipe programs includes recipe program instructions configured to be executed using a combination of the at least two hardware components under predefined operating conditions, wherein the predefined operating conditions include at least one operating parameter setting for a plurality of technical capability parameters of the at least two hardware components, the plurality of technical capability parameters indicating a functioning or a deficiency of a technical capability of each of a corresponding hardware component of the at least two hardware components, and further configured to forward the recipe program instructions to the cooking apparatus;

an operating parameter interface component configured to receive, from at least one sensor associated with the cooking apparatus, actual operating parameter values reflecting actual operating conditions of each of the at least two hardware components;

an operating conditions evaluator component configured to perform an evaluation of the actual operating parameter values, the at least one operating parameter setting, and the plurality of technical capability parameters, to thereby determine, prior to a recipe program instruction of the recipe program instructions being started, an actual technical capability parameter for at least one hardware component of the at least two hardware components, and in response to the evaluation indicating that the actual technical capability parameter deviates from the predefined operating conditions for the at least one hardware component and indicates a non-compensable deficiency thereof with respect to obtaining an expected, reproducible cooking result associated with the recipe program, the non-compensable deficiency being a technical deficiency regarding a technical capability of the at least one hardware component that prevents the expected reproducible cooking result from occurring, sending instructions to the cooking apparatus to prevent the recipe program instruction from beginning;

in response to the evaluation indicating that the actual technical capability parameter deviates from the predefined operating conditions for the at least one hardware component and indicates a compensable deficiency of the technical capability of the cooking apparatus that triggers a deviation from the expected, reproducible cooking result associated with the particular recipe program, determining compensation instructions for the cooking apparatus according to predefined compensation rules; and a recipe program adjustment component configured to adjust the recipe program according to the determined compensation instructions to maintain the expected, reproducible cooking result according to at least one recipe adjustment instruction in the compensation instructions.

2. The control system of claim 1, wherein the operating conditions evaluator component is further configured to determine:

if the actual technical capability parameter indicates a compensable deficiency associated with a calibration of the at least one sensor of the cooking apparatus, then, retrieve technical capability parameter settings from a capability parameter database, and send compensation instructions for the at least one sensor according to the retrieved technical capability parameter settings to restore the deficient capability of the at least one sensor;

if the actual technical capability parameter indicates a compensable deficiency associated with a technical component that is unrelated to the calibration of the at least one sensor of the cooking apparatus, then determine, in accordance with a recipe program adjustment pattern database, recipe program compensation instructions which are configured to improve the reproducibility of the cooking result with the deficient capability of the respective technical component and the recipe program adjustment component further configured to:

adjust the recipe program according to the determined compensation instructions according to the at least one recipe adjustment instruction.

3. The control system of claim 1, wherein the predefined operating conditions further include operating parameter settings of any one parameter type selected from the group consisting of:

machine status parameter of the cooking apparatus, and environment parameter of the cooking apparatus, wherein the recipe program adjustment component is further configured to adjust the recipe program according to predefined adjustment rules when an actual machine status parameter or an actual environment parameter is outside a tolerance range of the predefined operating conditions, and wherein the at least one recipe adjustment instruction is provided to the cooking apparatus to replace a portion of the particular recipe program to maintain the expected cooking result defined by the particular recipe program.

4. The control system of claim 3, wherein the predefined adjustment rules include alternative operating parameter settings for various operating conditions in relation to a corresponding set of predefined parameter settings.

5. The control system of claim 1, wherein the instructions to prevent automatic execution of the recipe program are configured to prevent or terminate any execution of the recipe program when the non-compensable deficiency relates to a safety relevant function of the cooking apparatus.

6. The control system of claim 1, wherein at least one operating parameter value corresponds to a physical parameter value measured by the at least one sensor of the cooking apparatus.

7. The control system of claim 1, wherein at least one operating parameter value corresponds to a physical parameter value measured by a further sensor that is remote from the cooking apparatus.

8. The control system of claim 1, wherein the at least two hardware components include a motor component, and further wherein the plurality of technical capability parameters include a rotational speed parameter of the motor component and a rotational direction parameter of the motor component.

9. The control system of claim 8, wherein adjusting the rotational speed parameter of the motor automatically results in an adjustment to the recipe program, the adjustment including at least an increased or decreased time period for operating the motor component during execution of the respective recipe program.

10. The control system of claim 8, wherein the determined compensation instructions trigger adjustment of the corresponding rotational speed parameter or the rotational direction parameter, responsive to the operating conditions evaluator component indicating the compensable deficiency associated with the technical capability of the motor component.

11. The control system of claim 1, wherein the at least two hardware components include at least two hardware components selected from the group consisting of: a motor component, a heating element, a scale, a temperature sensor, and a conductivity sensory.

12. The control system of claim 1, wherein the recipe program instructions include a sequence of recipe program instructions to execute a corresponding sequence of cooking steps of a recipe using the at least two hardware components, and define at least one dependency between operations of the at least two hardware components in order to advance the sequence.

13. The control system of claim 1, wherein the at least two hardware components include at least three hardware components, each providing at least one cooking function.

14. The control system of claim 1, wherein the at least two hardware components include at least four hardware components, each providing at least one cooking function.

* * * * *